Feb. 14, 1956  A. M. LIPPISCH  2,734,699
FLUID PROPELLED AND SUSTAINED AIRCRAFT
Filed Dec. 12, 1952  2 Sheets-Sheet 1
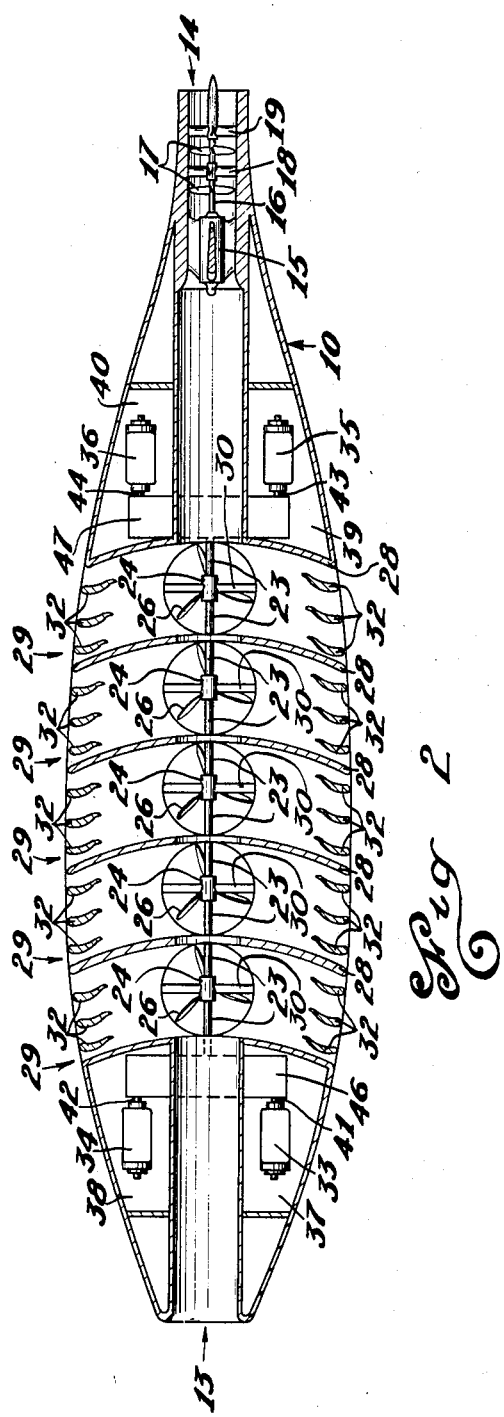
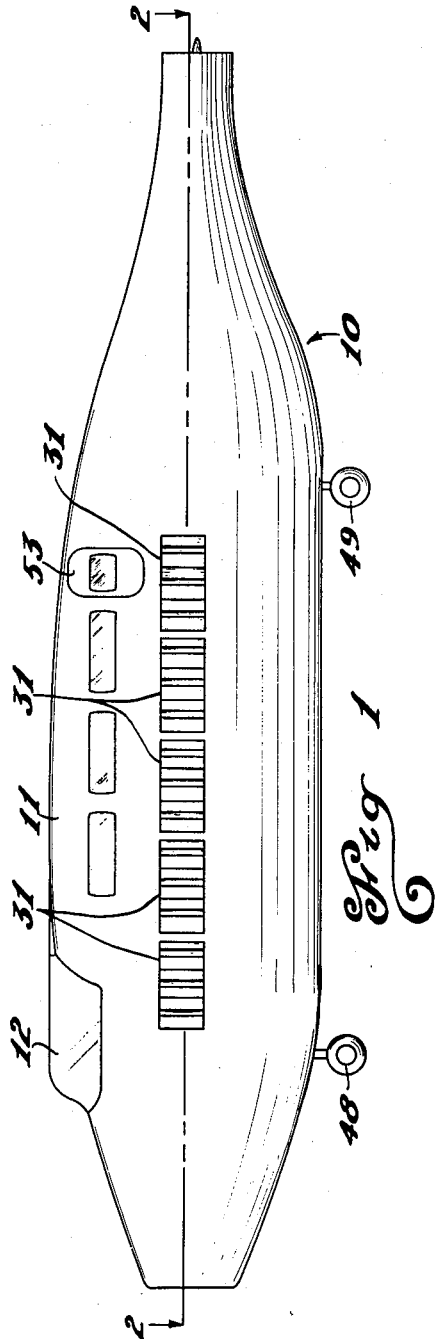
INVENTOR.
ALEXANDER M. LIPPISCH
BY
  Morris Moody
  ATTORNEY Feb. 14, 1956
A. M. LIPPISCH
2,734,699
FLUID PROPELLED AND SUSTAINED AIRCRAFT
Filed Dec. 12, 1952
2 Sheets-Sheet 2
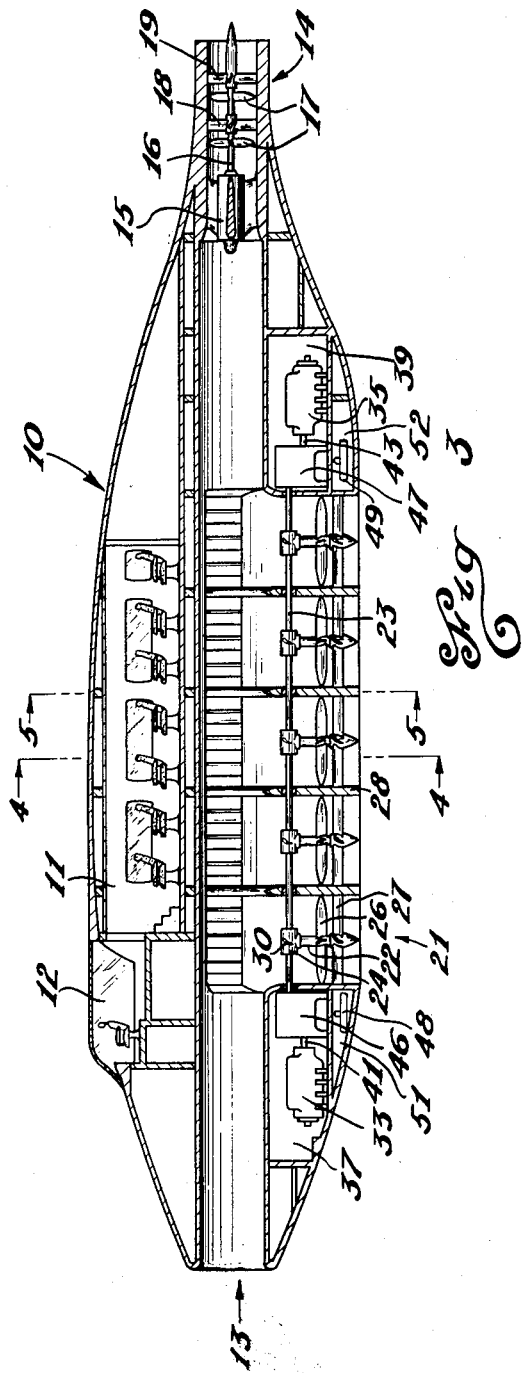
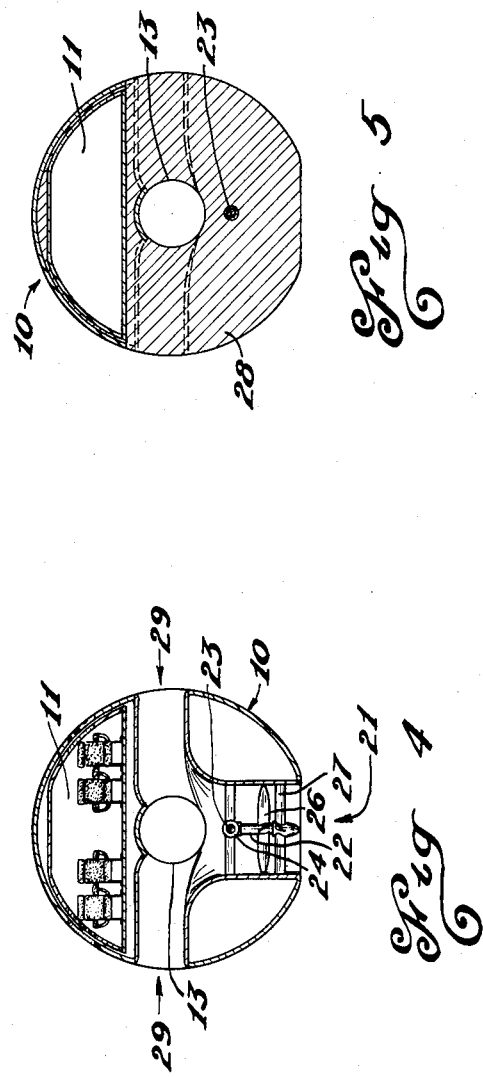
INVENTOR.
ALEXANDER M. LIPPISCH
BY
ATTORNEY

United States Patent Office 2,734,699
Patented Feb. 14, 1956

2,734,699
FLUID PROPELLED AND SUSTAINED AIRCRAFT

Alexander M. Lippisch, Cedar Rapids, Iowa, assignor to Collins Radio Company, Cedar Rapids, Iowa, a corporation of Iowa Application December 12, 1952, Serial No. 325,567

2 Claims. (Cl. 244—23)

This invention relates in general to aircraft, and in particular to a wingless aircraft.

As the field of aerodynamics has developed, faster and faster aircraft have appeared. The design of such aircraft has required that they land and take off at relatively high speeds so that the wing or support member will produce sufficient lift to raise the aircraft. The wing must not have too much drag at high speeds. This has meant that aircrafts land at faster and faster speeds until today our top jet fighters land at 140 miles an hour. Such speeds are extremely dangerous and require tremendously long runways. It is to be realized, of course, that it is primarily the wing which determines the high speed and low speed characteristics of the aircraft and a wing designed for high speed is not efficient at low speed.

To decrease the landing and take off speeds and thus increase the safety of aircraft, helicopters have been developed which eliminate the wing completely and replace it by a large open propeller mounted on a vertical axis above the fuselage. Such large propellers satisfactorily produce upward lift and deflect air downwardly but are very slow. This is because when the plane is moved forwardly at right angles to the plane of rotation of the propeller, opposite blades of the propeller will have different speeds relative to the surrounding air because of the forward translational motion of the aircraft. This results in unbalanced forces acting on opposite blades of the propeller which would destroy it if the forward speed became large. The limiting speed of such aircraft is, therefore, relatively low. To abrogate this translational difficulty the various blades of the propeller are modulated so that opposite blades have different angles of attack, but even so the forward speed is small.

I have shown in a prior patent application, Serial Number 214,723, filed March 9, 1951, entitled "Power Plant," now Patent No. 2,696,953 issued December 14, 1954, that when a propeller is mounted in a tube or duct, it will produce a thrust which is 1.6 times as great as an open propeller of the same diameter. Thus, if an aircraft propeller is mounted in a duct, its efficiency will be substantially increased. If a propeller is mounted on a vertical axis and surrounded by a vertical tube, it would not be subjected to the unbalanced forces which react on an open propeller during forward motion.

It is not practical to construct a large duct about a single large propeller because of the size and the resulting drag which would occur from such a structure.

It is therefore an object of the present invention to provide a wingless aircraft which comprises an elongated fuselage or other streamlined shape and which has mounted therein one or more ducted propellers that receive air from a boundary layer and direct it downwardly to produce lift.

It is another object of this invention to provide a wingless aircraft having a generally elongated fuselage which includes therein a plurality of ducted propellers or other propelling means and which move air downwardly from the fuselage so as to support it.

Still another object of this invention is to provide a wingless aircraft which includes the combination of a generally elongated fuselage and with propelling means forcing air downwardly to support the aircraft and rearwardly to push the aircraft forward.

Further features, objects and advantages of this invention will become apparent from the following description and claims when read in view of the drawings, in which:

Figure 1 is a side view of an aircraft according to this invention;

Figure 2 is a top sectional view taken on line 2—2 of Figure 1;

Figure 3 is a side sectional view;

Figure 4 is a sectional view taken on line 4—4 of Figure 3; and,

Figure 5 is a sectional view taken on line 5—5 of Figure 3.

Figure 1 illustrates an aircraft which has a fuselage designated generally as 10 which might be generally cigar-shaped and which has an upper portion 11 wherein the crew and passengers or cargo may be carried. A control cabin 12 is adjacent the forward end.

As best shown in Figure 3, a central opening 13 extends longitudinally through the fuselage 10 and a forward propelling power plant designated generally as 14 is mounted in the rear of the fuselage in alignment with the opening 13. The power plant 14 might be a conventional turbo-jet engine, or it might be a power plant such as described in my co-pending patent application, Serial Number 214,723, filed March 9, 1951, now Patent No. 2,696,953, and which includes a first motor 15 that has an output shaft 16 which drives one or more propellers 17. Counter vanes 18 and 19 are mounted behind each propeller and remove a portion of the rotational energy from the air flowing by. It is to be realized that any suitable forward propulsion means may be used.

Mounted intermediate the ends of the fuselage and formed with openings into the central opening 13, are a plurality of ducted units which are designated generally as 21.

For purposes of illustration, five ducted units are shown and may be clearly seen in Figures 2 and 3. The ducted units comprise substantially vertical shafts 22 which are connected to a common drive shaft 23 through gear boxes 24. Shafts 22 support propellers 26 that drive air downwardly and out the bottom of the aircraft. Guide vanes 30 support gear boxes 24.

Countervanes 27 are mounted below the propellers 26 and remove some of the rotational energy imparted to the air by the propellers so as to deflect it substantially downward.

The angle of the countervanes 27 may be adjusted so as to stabilize the aircraft.

The ducted units are separated from each other by partitions 28 that extend vertically through the fuselage. The partitions contain bearings through which the drive shaft 23 extends.

Communicating with the central opening 13 and with each of the ducted units are transverse openings 29, best shown in Figures 2 and 4. These openings communicate with the atmosphere through slots 31 formed in the fuselage of the aircraft and suck air from the boundary layer of the aircraft and impell it downwardly. Guide vanes 32 are supported by the fuselage in the transverse openings 29 and are shaped so that their side of greater camber is forward of the aircraft. This obtains an air foil reaction such as explained in the co-pending patent application Serial Number 214,723.

The partitions 28 may be slightly curved as shown in the top sectional view of Figure 2.

A plurality of motors, 33, 34, 35 and 36, as for example, internal combustion motors, may be mounted in forward and rear compartments 37, 38, 39 and 40. These compartments are below the axial opening 13 and at opposite ends of the plurality of ducted units 21. The output shafts 41, 42, 43 and 44 of the motors 33, 34, 35 and 36 are connected to transmission means 46 and 47 which are in turn connected to the output shaft 23.

Ground wheels 48 and 49 are mounted to the fuselage and are foldable within wheel wells 51 and 52 formed in the fuselage. Four wheels may be mounted on the aircraft and may be used to support the aircraft when on the ground.

It is to be noted that the upper portion of the fuselage is reserved for the control cabin and passengers or cargo, while the lower portion contains the central opening 13 and the downward and forward propulsion units. It is to be noted that the forward propulsion unit 14 is substantially independent of the downward propulsion units so that the aircraft may be raised and lowered substantially vertical. This means that the aircraft can land at a very low speed or with zero forward velocity in the same fashion as a helicopter, and that the vertical speed may be controlled by the power furnished to the propellers 26. The lift required to support the aircraft is equal to the weight of the aircraft and must be produced at all times by the propellers 26. This is true whether the plane is hovering with zero forward velocity or if it is traveling forward with high velocity. Thus, the propellers 26 and the driving means 33, 34, 35 and 36 may be designed for a substantially constant power output and the power need be varied only slightly to raise or lower the aircraft.

The use of a number of engines allows switching from various engines during flight in case engine trouble is encountered. It is proposed that the power output of a portion of the engines be great enough to sustain altitude so that mechanics may disengage and repair any engine which is causing trouble. It is to be noted that this is a great advantage over the present winged aircraft, wherein the engines are mounted in almost inaccessible places so that even the most simple adjustments of the engine are not possible. With the present structure, engines will be mounted in a readily accessible compartment and may be repaired and replaced in service in a manner similar to the way power generating equipment is switched in a power plant.

Because of the common drive shaft, one or more of the engines may be disconnected without changing the aerodynamic characteristics of the aircraft. This is not true in conventional aircraft where the engines are mounted along the wings because stopping one of the engines causes an unbalanced condition to exist, and the thrust will be applied in an asymmetrical manner.

In operation, the aircraft will be loaded through the door 53 with passengers or cargo and the crew will operate the plane from the control room 12. It is to be realized, of course, that the ground wheels will be down supporting the aircraft.

The vertical driving engines may be started and warmed up before take off and before being connected to the output shaft 23. The power transmissions 46 and 47 may be shifted when it is desired to take off so as to connect the motors to the propellers 26 which are driven by the drive shaft 23. Air will be sucked in through the axial opening 13 and the ducted transverse openings 29 and will be impelled downwardly by the propellers. When the amount of air propelled downwardly is great enough to lift the aircraft it will slowly rise straight upwardly. Control of the longitudinal and transverse vanes 27 will stabilize the aircraft. When a safe altitude has been reached, the motor 15 may be started so as to drive the propeller shaft 16 and propellers 17, thus producing a forward thrust which will drive the aircraft forward.

It is to be realized, of course, that the propellers 26 are continued in operation when forward motion occurs and that they are maintained at a speed so as to produce the desired climb or level flight.

The thrust developed when moving forward by the propellers 26 will be substantially equal to the thrust developed when there is zero forward motion.

It is to be noted from the cross sectional view of Figure 5 that the aircraft is substantially a cylinder with sharp pointed nose and tail and with a central opening formed therethrough. Thus, the drag will be greatly reduced when compared to a conventional aircraft which has a large wing with the nacelles and other propulsion means connected thereto. The drag of an aircraft constructed according to this invention would probably be of the order of one-fourth the drag of the conventional aircraft of comparable size.

Since it is the drag which limits the forward speed of an aircraft, the forward propulsion unit 14 will drive the aircraft at a great speed.

Since the ducts 29 and the axial opening 13 remove air from the surface of the fuselage, the drag will also be reduced because of the removal of the boundary layer.

It is seen that this invention provides means for propelling an aircraft and supporting it so that no wings are required.

Although this invention has been described with respect to a particular embodiment thereof, it is not to be so limited as changes and modifications may be made therein which are within the full intended scope of the invention as defined by the appended claims.

I claim:

1. A wingless heavier than air aircraft comprising, a fuselage which is generally cigar-shaped and formed with a central opening extending longitudinally therethrough, a forward propelling power plant mounted to said fuselage within said central opening, a plurality of transverse openings formed through said fuselage and communicating with said central opening, a plurality of guide vanes vertically supported by the fuselage within the transverse openings, said guide vanes formed in airfoil shape and mounted so that the side of greater camber faces forwardly of the aircraft, a plurality of vertical openings formed within said fuselage and extending from the bottom thereof to said central opening, and a plurality of driving means mounted in said vertical openings and adapted to produce upward thrusts.

2. A wingless heavier than air aircraft comprising, a fuselage which is generally cigar-shaped and formed with a central opening extending longitudinally therethrough, a forward propelling power plant mounted to said fuselage within said central opening, a plurality of transverse openings formed through said fuselage and communicating with said central opening, a plurality of guide vanes vertically supported by the fuselage within the transverse openings, said guide vanes formed in airfoil shape and mounted so that the side of greater camber faces forwardly of the aircraft, a drive shaft extending longitudinally of the fuselage and rotatably supported thereby, a plurality of vertical openings formed in said fuselage and extending from the bottom thereof to said central opening, a plurality of gear boxes supported by said fuselage and rotatably supporting said drive shaft, one of said gear boxes mounted in each of said vertical openings, a plurality of verticial shafts supported by said gear boxes, a plurality of countervanes attached to said fuselage within said vertical openings and rotatably supporting said vertical shafts, a plurality of propellers mounted on said vertical shafts, and a plurality of driving means coupled to said drive shaft.

References Cited in the file of this patent

UNITED STATES PATENTS

| | | |
|---|---|---|
| 1,457,024 | Franzen | May 29, 1923 |
| 1,638,961 | Richardsen | Aug. 16, 1927 |
| 1,697,770 | Kreikenbohm | Jan. 1, 1929 |
| 1,778,273 | Park | Oct. 14, 1930 |
| 1,907,394 | Van Vactor | May 2, 1933 |

OTHER REFERENCES

"The Contra Propeller," Bethlehem Shipbuilding Corp., 1925, pp. 3, 4.